Nov. 6, 1962  F. W. BROOKS  3,062,011
DUAL MASTER CYLINDER
Filed Nov. 28, 1960  3 Sheets-Sheet 1

INVENTOR.
Frank W. Brooks
By
His Attorney

Nov. 6, 1962  F. W. BROOKS  3,062,011
DUAL MASTER CYLINDER
Filed Nov. 28, 1960  3 Sheets-Sheet 2

INVENTOR.
Frank W. Brooks
By Arthur L. Nelson
His Attorney

Nov. 6, 1962

F. W. BROOKS 3,062,011

DUAL MASTER CYLINDER

Filed Nov. 28, 1960

INVENTOR.
Frank W. Brooks
BY
His Attorney

United States Patent Office 3,062,011
Patented Nov. 6, 1962

3,062,011
DUAL MASTER CYLINDER
Frank W. Brooks, Dayton, Ohio, assignor to General Motors Corporation, Detroit, Mich., a corporation of Delaware
Filed Nov. 28, 1960, Ser. No. 72,128
5 Claims. (Cl. 60—54.6)

This invention relates to a vehicle brake and more particularly to a dual master cylinder having valve means for controlling the pressure in the master cylinder.

In the conventional vehicle brake, the brake shoes are in spaced relation to the inner periphery of the brake drum when the brakes are in their retracted position. Only a low fluid pressure in the wheel cylinder is required to expand the brake shoes to contact the inner periphery of the brake drum. The subsequent pressure for setting the brake shoes to retard the rotation of the brake drum requires a higher pressure. By providing an initial low pressure high volume fluid displacement to engage the brake shoes with the brake drum and subsequent high pressure for setting of the vehicle brakes, a smaller means for pressurizing the fluid could be used.

Accordingly, this invention is intended to provide this type of operation. The master cylinder employs a piston and plunger forming a valve to provide a high volume low pressure fluid displacement initially. Subsequent fluid displacement has a high pressure low volume characteristic for setting of the vehicle brakes.

It is an object of this invention to provide a two stage pressure device operating within a master cylinder for the vehicle brakes.

It is another object of this invention to provide a plunger mounted concentric with a piston which is mounted within the master cylinder whereby the plunger and piston form a valve which automatically controls fluid displacement for large volume low pressure initial displacement and low volume high pressure subsequent fluid displacement.

It is a further object of this invention to provide a power operated piston in combination with the master cylinder which is connected to the power wall of a booster unit. A concentrically mounted manually operated plunger forms a valve with the piston.

It is a further object of this invention to provide a manually controlled reaction member concentrically located within a power operated fluid displacing member in combination with the master cylinder to provide high volume low pressure initial fluid displacement and low volume high pressure subsequent fluid displacement during the braking cycle.

The objects of this invention are accomplished by connecting the power wall of a booster unit to the master piston in a master cylinder. A manual operating means extends into the booster unit and engages the valve control and also a central plunger which extends concentrically into the master cylinder within the master piston. The manual means controls the operation of the booster unit and also receives reaction from the plunger which extends itno the pressurizing chamber of the master cylinder. Initial fluid displacement is provided through the use of the master piston and the plunger operating as a unit to displace a high volume low pressure fluid engaging the brake shoes with the inner periphery of the brake drum. The plunger and the master piston operate as a valve whereby only the plunger pressurizes fluid for subsequent fluid displacement as the brakes are operated. In this manner, the vehicle brakes are set by a low volume and high pressure displacement which thereby can be accomplished with a smaller booster unit for a given run-out hydraulic fluid pressure.

Further objects and advantages of the present invention will be apparent from the following description, reference being had to the accompanying drawings wherein preferred embodiments of the present invention are clearly shown.

Figure 1:
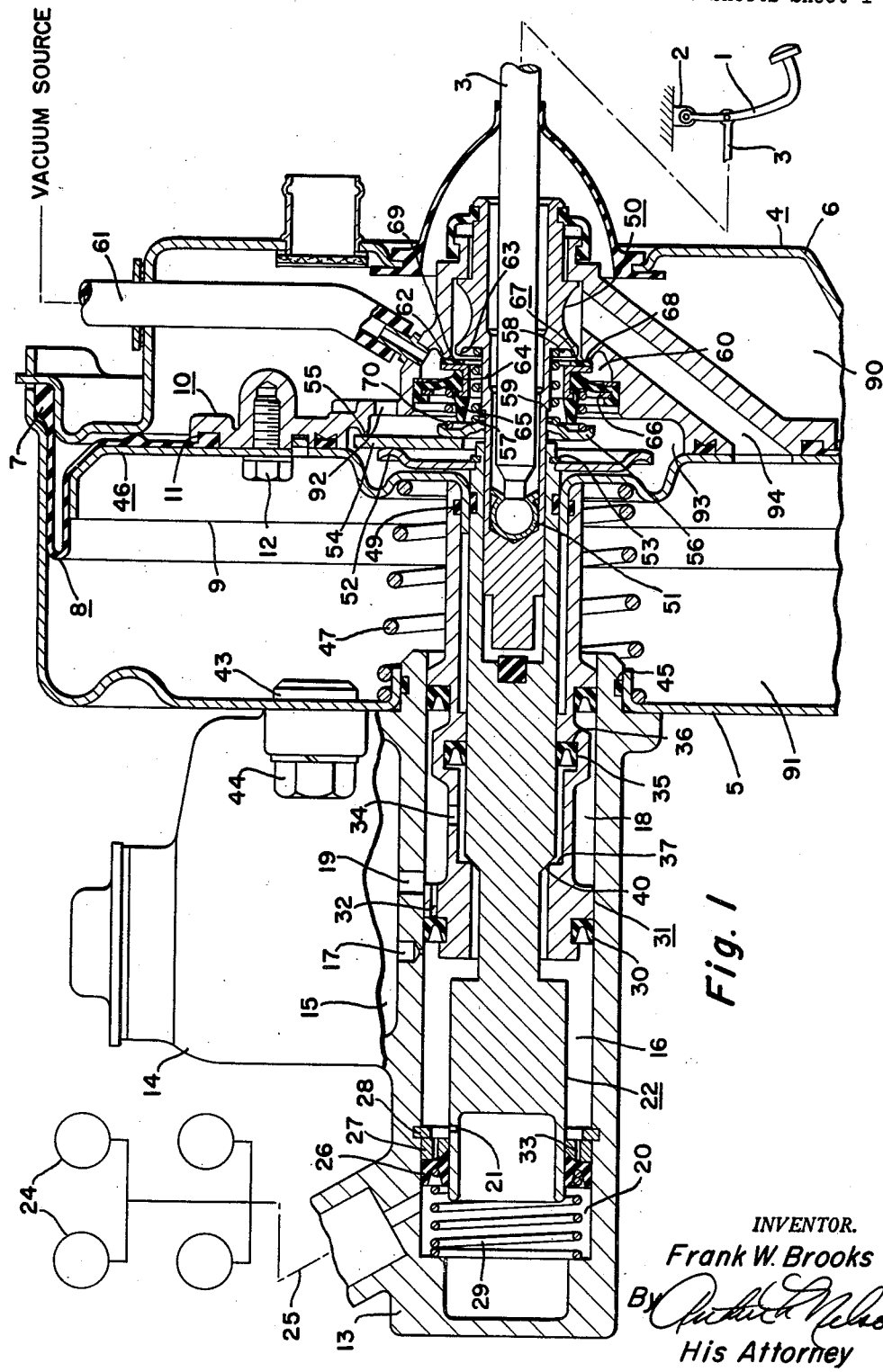
FIGURE 1 is a cross section view of the booster unit and the master cylinder. The unit is in its retracted position.
Figure 2:
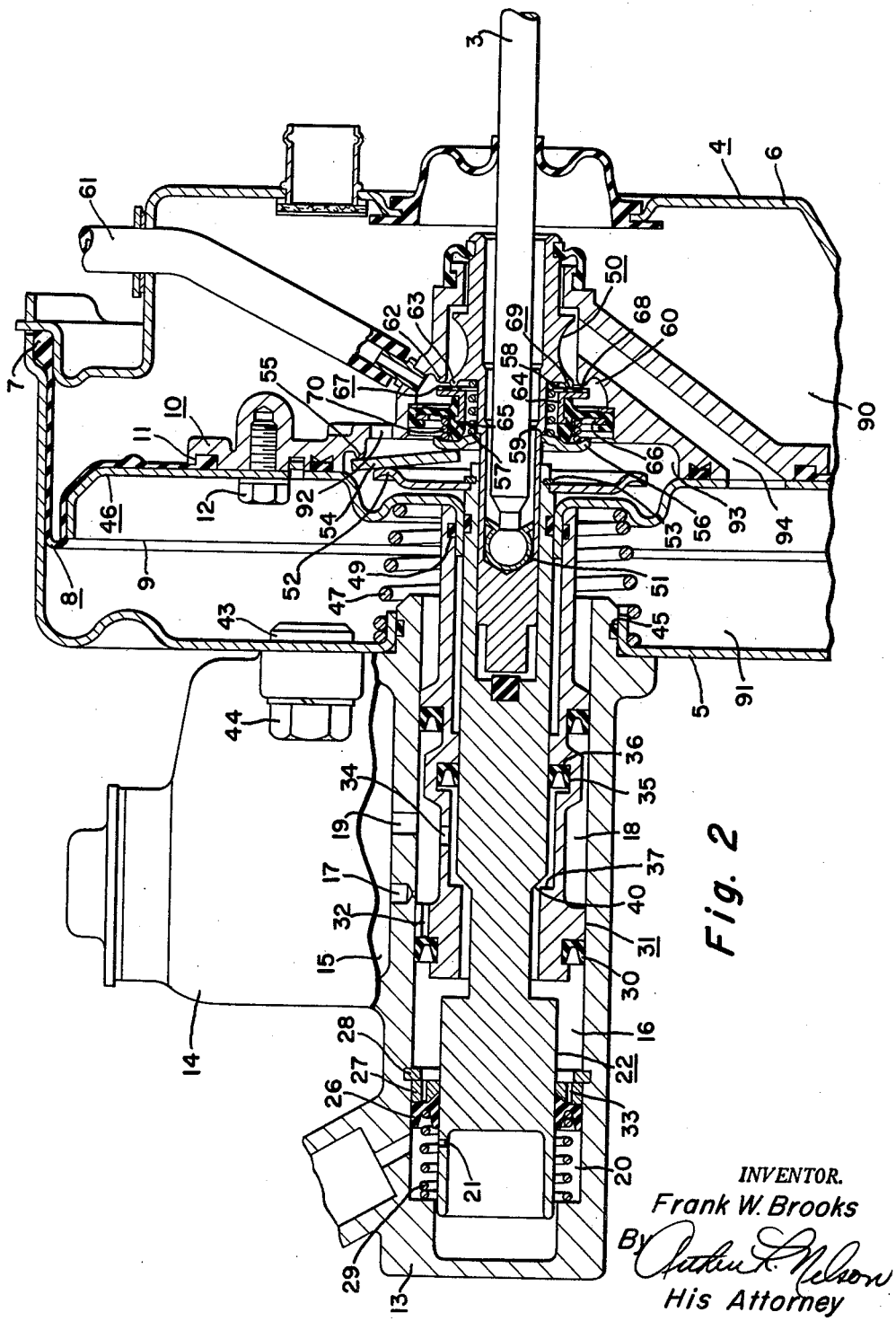
FIGURE 2 is a cross section view of the booster unit with the booster valves in the operating position and the hydraulic valve in the master cylinder in the open position.

Referring to FIGURE 1, the brake pedal 1 is pivotally mounted on the chassis 2 and pivotally connected to the push rod 3. The push rod 3 extends into the booster unit 4 to operate the valve means. The booster unit 4 includes a forward casing section 5 and a rearward casing section 6 which are locked together to form a seal on the peripheral bead 7 of the diaphragm 8. The diaphragm 8 extends radially inward and forms a seal with the diaphragm support 9 and the valve housing 10. The inner bead 11 of the diaphragm 8 is received within an annular recess of the valve housing 10. The diaphragm support 9 and valve housing 10 are fashioned by a plurality of bolts 12.

The master cylinder 13 is cast integral with the reservoir 14. The reservoir 14 contains a reservoir chamber 15 which is in communication with the low pressure chamber 16 through vent 17. The follow-up chamber 18 is in communication with the reservoir chamber 15 through the port 19. The high pressure chamber 20 of the master cylinder 13 is in communication with the low pressure chamber 16 through the vent 21 of the plunger 22. During initial operation of the booster unit, the low pressure chamber 16 and the high pressure chamber 20 are in communication with the plurality of vehicle brakes 24 through the conduit means 25. The seal 26 for the high pressure chamber 20 is mounted on the annulus 27 which abuts the snap ring 28. The seal 26 is retained in this position by the spring 29 in the forward end of the master cylinder 13.

The low pressure chamber 16 is sealed by the primary seal 30 on the forward end of the master piston 31. A plurality of axially extending passages 32 relieve the pressure in the low pressure chamber 16 upon rearward movement of the piston 31. Similar axial extending passages 33 relieve the pressure in the high pressure chamber 20 upon return of the plunger 22 when the brakes are released. The master piston 31 is also formed with a plurality of radially extending passages 34 to permit the pressure in the low pressure chamber to return to atmospheric pressure during the subsequent portion of the stroke of the master piston 31.

The inner periphery of the master piston 31 is formed with an annular recess 35 for reception of a secondary seal 36. A radial flange 37 is formed on the inner periphery of the master piston 31 which operates as a hydraulic valve element. The hydraulic valve element 37 of the master piston 31 engages the frusto-conical valve seat 40 on the plunger 22 when the hydraulic valve is closed.

The master cylinder 13 and the booster unit 4 are connected to each other by means of a plurality of bolts 43 and nuts 44. The seal 45 is received in an annular recess on the outer periphery and rearward portion of the master cylinder 14. The seal 45 engages the inner periphery of the forward section 5 of the booster unit 4. The power wall 46 is biased to a rearward position by a spring 47.

The master piston 31 is connected to the diaphragm support 9 and is sealed by the seal 49.

The plunger 22 has a central opening extending forwardly from its rearward end for reception of the valve element 50. The valve element 50 is concentrically mounted within the central opening in the plunger 22 and extends rearwardly within the booster unit. The air valve element 50 also has a central opening extending forwardly from the rearward end for reception of the push rod 3. The push rod 3 is locked within the air valve 50 by the retainer 51. The plunger 22 extends rearwardly within the power wall 46 and is received within the reaction plate 52 which is fastened to the plunger by a snap ring 53. The reaction plate 52 engages a plurality of fingers 54 which pivot on a fulcrum 55 which is formed on the inner periphery of the valve housing 10. The radially inner portion of the fingers 54 engage a reaction plate 56. The reaction plate 56 receives the air valve element 50. The air valve spring 57 is compressively positioned between a radially wall 58 on the air valve element 50 and the reaction disk 56. The shouldered portion 59 on the air valve element engages the reaction disk 56 in its rearward position when full reaction is being transmitted from the plunger 22 to the push rod 3.

The power wall 46 being connected to the master piston 31 moves as a unit with the master piston. The air valve element 50 moves with the plunger 22 during operation of the booster unit. The air valve element 50 however can move relative to the plunger 22 due to the space between the forward end of the air valve element 50 and the plunger 22. The air valve element 50 can also move relative to the master piston 31 to operate the valve means within the master cylinder. The reaction force is transmitted through the plunger 22 through the reaction means to the air valve element 50. As previously indicated, the reaction disk 56 is permitted to move axially relative to the air valve element 50 to its rearmost position in engagement with the shoulder 59 on the air valve element 50.

Referring to the valve means, the valve housing 10 encloses a vacuum chamber 60. The vacuum chamber 60 is in communication with a source of vacuum through the conduit means 61. An annular, axially-extending bead 62 is formed on the inner periphery of the valve housing 10. The sliding air valve element 50 is also provided with an axially extending annular bead 63 which is concentric with the vacuum valve element 62.

A valve seat member 64 is mounted concentrically within the valve seat diaphragm 65. The outer peripheral portion of the valve seat diaphragm 65 engages the inner periphery of the valve housing 10 and is retained in this position by a snap ring 66. A radial facing is formed on the rearward side of the valve seat member 64 to which an annulus 67 is bonded to form the vacuum valve seat 68 and the air valve seat 69. The valve seat member is normally biased to an engaging position with the vacuum valve element 62 by the spring 70. The air valve element 50 is normally biased to a rearward position by the air valve spring 67.

Figure 3:
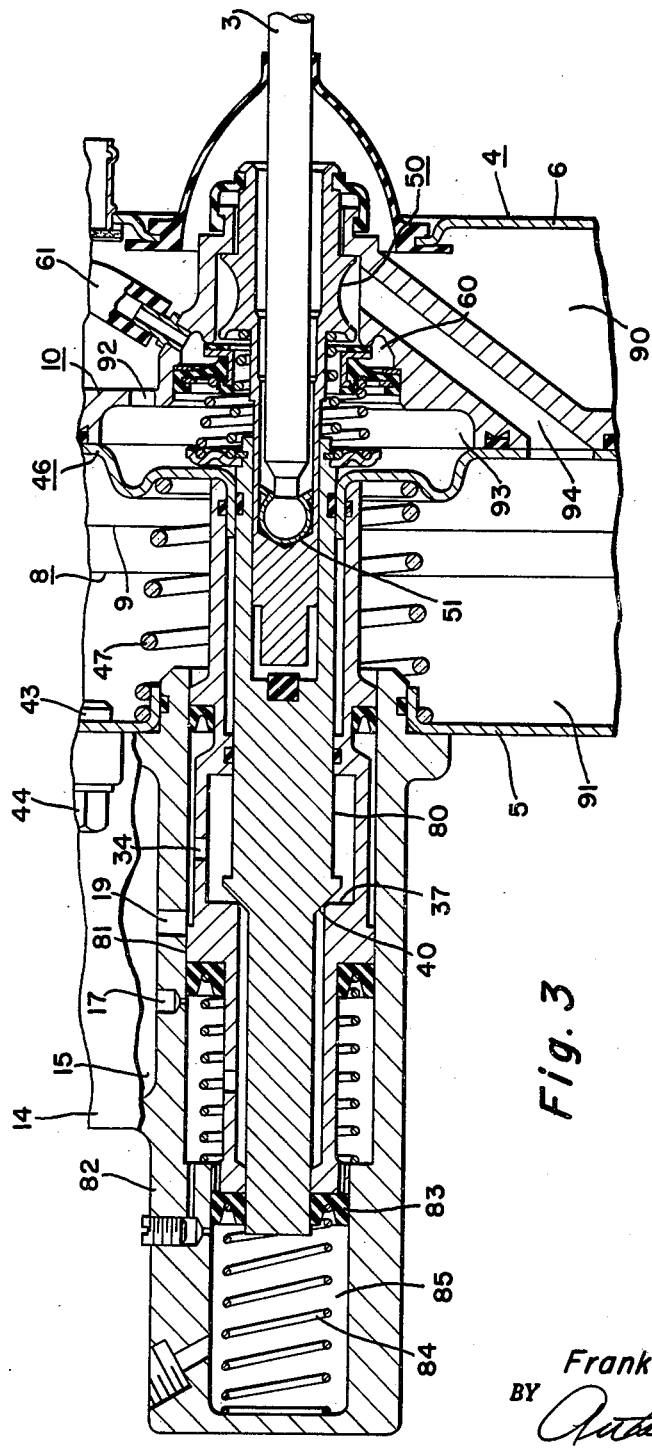
FIGURE 3 is a cross section view of a modification showing an optional method for providing reaction within the master cylinder.

Referring to FIGURE 3, a modification is illustrated which disclosed a means for changing the proportion of the reaction force through the plunger 80. The master piston 81 receives the plunger 80 and is mounted for operation in combination with the master cylinder 82. It is noted that the master piston 81 as shown extends rearwardly to engage the power wall in the booster unit. The extreme forward end of the master piston 81 engages the primary seal 83 which is maintained in contact with the forward portion of the master piston 81 by the spring 84. The primary seal 83 forms a seal on the outer periphery of the plunger 80 where the plunger extends into the high pressure chamber 85. In this manner, the greater portion of the reaction in the high pressure chamber may be transmitted to the power wall and a predetermined smaller portion may be transmitted to the plunger 80. The plunger 80 is connected to the manual control means through the air valve element in the booster unit.

The operation of the device will be described in the following paragraphs:

The booster unit in its normally retracted position has ambient air pressure in the constant pressure chamber 90 and the variable pressure chamber 91. The power wall 46 is biased to a rearward position by the spring 47. The air valve spring 57 biases the air valve element 50 in spaced relation to the air valve seat 68. In this position, the vacuum valve is closed and the vacuum chamber 60 is no longer in communication with the variable compartment in the booster unit 4. The constant pressure compartment 90 is in communication with the variable pressure compartment 91 through the passage 92 to the air chamber 93. The air chamber 93 is in communication with the passage 94 through the air valve.

The plunger 22 is biased to a rearward position by the spring 29. The master piston 31 is biased to a rearward position by the spring 47 which operates against a power wall 46.

As the brake pedal 1 is depressed, the push rod 3 moves forwardly within the booster unit 4. The forward movement of the push rod 3 carries the air valve element 50 forward to contact the air valve seat 69. Continued forward movement of the air valve element 50 unseats the vacuum valve element 52 from the vacuum valve seat 68. The seating of the air valve element 50 on the air valve seat 69 closes the variable pressure compartment 91 from the constant pressure compartment 90. The unseating of the vacuum valve element 62 from the vacuum valve seat 68 places the vacuum chamber 60 in communication with the variable pressure compartment 91. In this position, the variable pressure compartment 91 is evacuated. The evacuation of the variable compression compartment causes the power wall 46 to move forwardly carrying the master piston 31. The push rod continues the forward movement of the air valve element 50. The spring 57 being compressibly mounted between the air valve element 50 and the plunger 22 moves the plunger 22 forwardly. The plunger 22 and the master piston 31 move forwardly as a unit whereby the hydraulic valve formed by the frusto-conical section 40 and the radial flange 37 are in an engaging position. This causes the pressurization of fluid in the low pressure chamber 16 and the high pressure chamber 20. The fluid in the low pressure chamber 16 moves through axially extending passages 33 around the seal 26 into the high pressure chamber 20. The fluid in the high pressure chamber 20 moves through conduit means 25 into the plurality of vehicle brakes 24.

As the power wall 46 continues to move forwardly, the master piston 31 and the plunger 22 continue to move forwardly as a unit until the brake shoes engage the inner periphery of the brake drum. At this point, an increase in pressure is built up in the high pressure chamber of the master cylinder 13. The increase in pressure seats the vehicle brake shoes firmly in the inner periphery of the drum and causes the retardation of the brake drum.

An increased reaction force is transmitted rearwardly through the plunger 22. The increased reaction force causes a spring 57 to compress. This causes the reaction disk 56 to seat on the shoulder 59. The reaction force from the plunger 22 is transmitted to the reaction plate 52 and thence through the plurality of fingers 54. The force transmitted to the plurality of fingers 54 is distributed between the valve housing 10 and the reaction disk 56. A portion of the reaction force is transmitted to the air valve element 50 and then rearwardly to the push rod 3 and the manually operated means.

With the rearward shifting movement of the plunger 22 relative to the piston 31, the hydraulic valve formed by the plunger and the piston opens. This relieves the pressure in the low pressure compartment 16 and firmly seats the seal 26 on the annulus 27. The pressure within the low pressure chamber 16 returns to atmospheric pressure as the pressure is vented to the atmosphere to the passage 34 and port 19 to the reservoir 14. Continued forward movement of the air valve element 50 and the power wall 46 causes an increased pressure in the high pressure chamber 20. The forward movement of the power wall transmits a force through the plurality of fingers 54 and the forward movement of the air valve 50 transmits a force through the fingers as well. The forces pressurize fluid in chamber 20 to actuate the brakes.

As the vehicle brakes are released, the air valve element 50 is permitted to retract under the biasing force of the spring 57. This permits the vacuum seat 68 to again contact the vacuum valve element 62 preventing further evacuation of the variable compression compartment 91. Continued rearward movement of the air valve element 50 opens the air valve element 50 from the air valve seat 69 placing communication between the constant pressure component 90 and the variable pressure compartment 91. The spring 47 biases the power wall to a rearward position. The plunger 22 and the master piston 31 return to the normally retracted position again placing communication between the low pressure chamber 16 and the reservoir chamber 15 through vent 17.

The operation of the modification as illustrated in FIG. 3 is similar to the operation described in the preceding paragraphs, the difference being in the proportion of reaction transmitted to the power wall and the manual control means. This reaction is distributed in relation to the difference of areas on the forward sides of the master piston 81 of the plunger 80.

It can be seen from the description and operation that the booster unit provides a means for quick take-up of the brake shoes in engagement with the brake drum. This is accomplished through high fluid displacement during the initial portion of the braking cycle. Subsequent to engagement of the brake shoes with the brake drum, the plunger provides the increased pressure in the high pressure chamber to provide low volume fluid displacement with the high pressure to firmly seat the brake shoes on the inner periphery of the brake drum.

While the embodiments of the present invention as herein disclosed, constitute preferred forms, it is to be understood that other forms might be adopted.

What is claimed is as follows:

1. A fluid pressurizing means comprising in combination, a booster unit including, a housing means, a pressure responsive member forming a variable pressure compartment and a constant pressure compartment in said booster unit, a valve means in said pressure responsive member, a manual means connected to said valve means for controlling the operation of said booster unit, a source of low pressure fluid in communication with said valve means, a master cylinder connected to said booster unit, a master piston extending into said master cylinder and connected to said pressure responsive member, a plunger slidably extending through said master piston and in said master cylinder connected to said manual control means and said pressure responsive member through a reaction distribution means, a central opening in said master piston, a valve seat portion on said plunger engaging said central opening in said master piston to form a hydraulic valve, a high pressure chamber formed by the forward end of said plunger and said master cylinder, a low pressure chamber formed by said master cylinder said plunger and said master piston, said master piston and said plunger having a normally closed hydraulic valve positioned to pressurize hydraulic fluid in said low pressure chamber and said high pressure chamber during initial forward movement of said power wall, said master piston and said plunger moving relative to each other to open said valve means and provide pressurization in said high pressure chamber only during subsequent forward movement of said power wall as said booster unit is operated.

2. A fluid pressurizing means comprising in combination, a booster unit including, a housing means, a pressure responsive member in said housing means forming a variable pressure compartment and a constant pressure compartment, a valve means in said pressure responsive member, a manual means connected to said valve means, a source of low pressure fluid in communication with said valve means, a master cylinder connected to said booster unit, a master piston connected to said pressure responsive member, a plunger connected to said pressure responsive member and said manual control means through a reaction means, hydraulic valve means including an opening in said master piston and a shoulder on said plunger for opening and closing said opening, a high pressure chamber formed by said master cylinder and said master piston and said plunger, a low pressure chamber formed by said master cylinder and said master piston and said plunger, said hydraulic valve means controlling first hydraulic connection between said low pressure chamber and said reservoir, a second hydraulic valve means controlling hydraulic communication between said low pressure chamber and said high pressure chamber, said first hydraulic valve means having a normally closed position to provide movement of said master piston and said plunger as a unit during initial forward movement of said pressure responsive member and having an open position controlled in response to a predetermined pressure in said low pressure chamber to permit pressurization only in said high pressure chamber during subsequent movement of said power wall when said booster unit is in operation.

3. A fluid pressurizing means comprising in combination, a booster unit including, a housing means, a power wall forming a variable pressure compartment and a constant pressure compartment in said housing means, a valve means in said power wall, a source of low pressure fluid in communication with said valve means, manual control means engaging said valve means for controlling the operation of said booster unit, a master cylinder connected to said booster unit, a master piston connected to said power wall, a plunger connected to said manual control means, a central opening forming a portion of a hydraulic valve of said master piston, a shouldered portion on said plunger forming the remaining portion of said hydraulic valve, a high pressure fluid chamber formed by said master cylinder said master piston and said plunger in communication with fluid means adapted for actuating the plurality of vehicle brakes, a low pressure fluid chamber in controlled communication through said hydraulic valve to said reservoir, said master piston and said plunger having a normally closed position to provide pressurization of fluid in said low pressure chamber and said high pressure chamber during initial forward movement of said power wall, said hydraulic valve having an open position controlled in response to a predetermined pressure in said low pressure chamber acting on said plunger thereby providing subsequent pressurization only in said high pressure fluid chamber during the subsequent portion of the forward movement of said power wall when said booster unit is operated.

4. A fluid pressurizing means comprising in combination, a booster unit including, a housing means, a pressure responsive member forming a variable pressure compartment and a constant pressure compartment in said housing means, a valve means in said pressure responsive member, a source of low pressure fluid in communication with said valve means, manual means engaging said valve means for controlling the operation of said booster unit, a master piston connected to said pressure responsive member, a plunger concentrically located within said master piston and said master cylinder, a reaction means for proportioning the reaction force from said plunger to said pressure responsive member and said manual control means, a central opening in said master piston forming a valve seat, a shouldered portion on said plunger forming a valve element, said valve seat and said valve element forming a hydraulic valve, a high pressure chamber formed by said master cylinder said master piston and said plunger in communication with hydraulic means adapted for actuating a plurality of vehicle brakes, a low pressure chamber formed by said master cylinder said master piston and said plunger in controlled communication with said high pressure chamber and said reservoir, said hydraulic valve having a normally closed position to pressurize fluid in said low pressure and high pressure chambers during initial operation of said booster unit, said valve means opening in response to a predetermined pressure in said low pressure chamber to permit subsequent pressurization of fluid solely in said high pressure chamber during subsequent operation of said booster unit when said vehicle brakes are actuated.

5. Fluid pressurizing means comprising in combinaation, a booster unit including a housing and a movable power wall dividing the interior of said housing into a variable pressure compartment and a constant pressure compartment and first valve means for controlling admission of fluid pressure to said variable pressure compartment from a source of fluid pressure at a pressure other than the constant pressure in said constant pressure compartment, said valve means having a manual input portion, manually actuated means engaging and actuating said valve means manual input portion for operating said valve means and controlling said booster unit, a master cylinder connected to said housing, a master piston extending into said master cylinder and connected to said power wall to be moved thereby and having a bore therethrough and an internal flange formed in said bore, a plunger extending through said master piston and into said master cylinder and having a shoulder engageable with said piston flange and cooperating therewith to provide second valve means, said plunger and master cylinder defining a high pressure output chamber, said plunger and master piston and master cylinder defining a low pressure output chamber, said master piston and master cylinder defining a follow-up chamber, third valve means interconnecting and permitting hydraulic flow only from said low pressure chamber to said high pressure chamber, and resilient reaction means interconnecting said plunger and power wall and first valve means manual input portion, said power wall being operable to move said master piston and said plunger in said master cylinder as a unit with said second valve means closed to pressurize said high pressure output chamber and said low pressure output chamber until the pressure in said high pressure output chamber acting on said plunger moves said plunger against said resilient reaction means to open said second valve means and connect said low pressure chamber to said follow-up chamber, said power wall being operable to further move said master piston directly and said plunger through said resilient reaction means to further pressurize fluid only in said high pressure output chamber.

References Cited in the file of this patent
UNITED STATES PATENTS

| | | |
|---|---|---|
| 2,031,360 | Boughton | Feb. 18, 1936 |
| 2,331,238 | Schnell | Oct. 5, 1943 |
| 2,811,835 | Rike | Nov. 5, 1957 |